United States Patent
Pinto

(10) Patent No.: US 10,838,852 B2
(45) Date of Patent: Nov. 17, 2020

(54) SYSTEM AND METHOD TO EXTEND NVME QUEUES TO USER SPACE

(71) Applicant: Samsung Electronics Co., Ltd., Suwon-si (KR)

(72) Inventor: Oscar Prem Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 284 days.

(21) Appl. No.: 14/862,145

(22) Filed: Sep. 22, 2015

(65) Prior Publication Data

US 2016/0306580 A1 Oct. 20, 2016

Related U.S. Application Data

(60) Provisional application No. 62/149,509, filed on Apr. 17, 2015.

(51) Int. Cl.
*G06F 12/00* (2006.01)
*G06F 12/02* (2006.01)

(52) U.S. Cl.
CPC .. *G06F 12/0238* (2013.01); *G06F 2212/1044* (2013.01); *G06F 2212/202* (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 7,962,563 B2 | 6/2011 | Becker-Szendy et al. | |
| 9,276,824 B2 | 3/2016 | Shimmitsu et al. | |
| 9,389,895 B2 | 7/2016 | Oshins et al. | |
| 9,501,245 B2 | 11/2016 | Hussain et al. | |
| 9,720,717 B2 | 8/2017 | Carson et al. | |
| 2002/0144001 A1* | 10/2002 | Collins | G06F 12/1081 709/250 |
| 2005/0138242 A1* | 6/2005 | Pope | G06F 9/544 710/48 |
| 2005/0210479 A1* | 9/2005 | Andjelic | H04L 49/90 719/321 |
| 2005/0256976 A1* | 11/2005 | Susairaj | G06F 12/1081 710/3 |
| 2006/0195663 A1 | 8/2006 | Arndt et al. | |

(Continued)

OTHER PUBLICATIONS

Stack Overflow, Linux kernel device driver to DMA from a device into user-space memory, Apr. 4, 2011, https://stackoverflow.com/questions/5539375/linux-kernel-device-driver-to-dma-from-a-device-into-user-space-memory.*

(Continued)

*Primary Examiner* — Reginald G Bragdon
*Assistant Examiner* — Michael L Westbrook
(74) *Attorney, Agent, or Firm* — Renaissance IP Law Group LLP

(57) ABSTRACT

An embodiment includes a system, comprising: a processor configured to: read a stride parameter from a device coupled to the processor; and map registers associated with the device into virtual memory based on the stride parameter; wherein: the stride parameter is configured to indicate a stride between the registers associated with the device; and the processor is configured to map at least one of the registers to user space virtual memory in response to the stride parameter.

19 Claims, 8 Drawing Sheets

(56) References Cited

U.S. PATENT DOCUMENTS

| | | | |
|---|---|---|---|
| 2006/0236063 A1* | 10/2006 | Hausauer | G06F 12/1081 |
| | | | 711/170 |
| 2008/0229035 A1* | 9/2008 | Thayer | G06F 12/0607 |
| | | | 711/157 |
| 2009/0122627 A1* | 5/2009 | Rao | G06F 12/0215 |
| | | | 365/203 |
| 2013/0305006 A1* | 11/2013 | Altman | G06F 3/0622 |
| | | | 711/163 |
| 2014/0281040 A1 | 9/2014 | Liu | |
| 2014/0281083 A1 | 9/2014 | Canepa et al. | |
| 2014/0317219 A1 | 10/2014 | Fitch et al. | |
| 2014/0331001 A1 | 11/2014 | Liu et al. | |
| 2016/0004438 A1 | 1/2016 | Moon et al. | |
| 2016/0306580 A1 | 10/2016 | Pinto | |
| 2017/0024132 A1 | 1/2017 | Jun et al. | |
| 2017/0235510 A1 | 8/2017 | Hu et al. | |
| 2017/0329625 A1 | 11/2017 | Li | |

OTHER PUBLICATIONS

Intel Corporation, "NVM Express," NVM Express 1.0e, Jan. 23, 2013 (127 pages).

Storage Switzerland, LLC, "Docker: What do Storage Pros need to know?", Independent Analysis of Storage and Data Protection, 2015 (3 pages).

Final Office Action for U.S. Appl. No. 15/959,108, dated Mar. 9, 2020.

Notice of Allowance for U.S. Appl. No. 15/959,108, dated Jun. 24, 2020.

* cited by examiner

SYSTEM AND METHOD TO EXTEND NVME QUEUES TO USER SPACE

CROSS-REFERENCE TO RELATED APPLICATIONS

This application claims the benefit of U.S. Provisional Patent Application No. 62/149,509, filed Apr. 17, 2015, the content of which is hereby incorporated by reference herein, in its entirety, for all purposes.

BACKGROUND

This disclosure relates to extending queues to user space and, in particular, extending NVM Express (NVMe) queues to user space.

NVMe devices may implement multiple ring buffers or queues. These queues may be managed by device drivers in software. The queues may be associated with doorbell registers, which may be used in accessing the queues. Access to the queues and hence, the NVMe devices, may pass through various kernel software layers, such as file system layers, block layers, or the like.

SUMMARY

An embodiment includes a system, comprising: a processor configured to: read a stride parameter from a device coupled to the processor; and map registers associated with the device into virtual memory based on the stride parameter; wherein: the stride parameter is configured to indicate a stride between the registers associated with the device; and the processor is configured to map at least one of the registers to user space virtual memory in response to the stride parameter.

An embodiment includes a method, comprising: reading a stride parameter from a device, the stride parameter indicating a stride between registers of the device; mapping the registers into virtual memory based on the stride parameter; wherein the stride parameter is set such that at least one register is mapped to user space virtual memory.

An embodiment includes a device, comprising: a memory configured to store data; a plurality of memory mappable registers associated with the memory; and a stride register configured to store a stride parameter indicating a stride of the memory mappable registers; wherein the stride parameter is set such that a separation of the memory mappable registers is non-zero.

DETAILED DESCRIPTION

Figure 1:
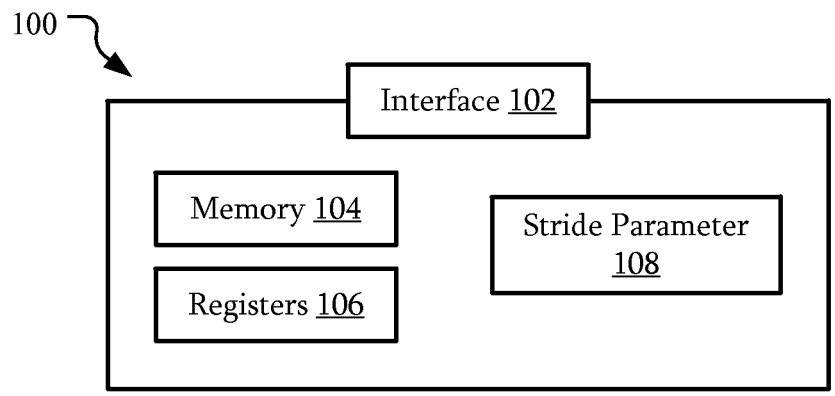
FIG. 1 is a schematic view of a device according to an embodiment.

Embodiments relate to extending queues to user space and, in particular, extending NVM Express (NVMe) queues to user space. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

However, the methods and systems will operate effectively in other implementations. Phrases such as an embodiment", one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain steps. However, the method and system may operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular system having certain components. One of ordinary skill in the art will readily recognize that embodiments are consistent with the use of systems having other and/or additional components and/or other features. Methods and systems may also be described in the context of single elements. However, one of ordinary skill in the art will readily recognize that the methods and systems are consistent with the use of systems having multiple elements.

It will be understood by those skilled in the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an"

should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a device according to an embodiment. In this embodiment, a device 100 may include an interface 102, a memory 104, registers 106, and a stride parameter 108.

The interface 102 may include hardware, controllers, firmware, software, or the like through which the device 100 may be accessed. For example, the interface 102 may include an interface to a Peripheral Component Interconnect (PCI) bus, or any other bus usable by a processor to access associated devices. In particular, the bus may be a processor-local bus local to a processor. In some embodiments such a processor local bus may be directly connected to the processor; however, in other embodiments, an intervening switch, hub, or the like may be present between the processor and the bus. Examples of such processor-local busses include PCI, PCI Express (PCIe), VESA Local Bus, Accelerated Graphics Port (AGP), Industry Standard Architecture (ISA) bus, Universal Serial Bus (USB), a peripheral expansion bus, a local bus, a system bus, a memory bus, or similar busses.

The memory 104 may be configured to store data. The memory 104 may be implemented in a variety of ways. For example, the memory 104 may include volatile memory, non-volatile memory, dynamic memory, static memory, flash memory, magnetic memory, optical memory, a combination of such memories, or the like.

The registers 106 are memory mappable registers associated with the memory 104. The registers 106 may include configuration parameters for the device 100. For example, if the interface 102 is configured to be coupled to a PCIe bus, the registers 106 may be associated with various identifiers, pointers, parameters, capabilities, or the like of the device 100. Although illustrated as separate from the memory 104, in some embodiments, the registers 106 may be part of the memory 104.

The stride parameter 108 is a parameter configured to indicate a stride of at least some of the registers 106. For example, registers 106 of a particular type may be mapped to memory based on the stride parameter 108. In particular, the stride parameter may be set such that a separation of those memory mappable registers is non-zero. That is, addresses of sequentially mapped registers 106 may be greater than the size of a registers. For example, if the particular registers are four bytes in length, the stride parameter 108 may be set such that addresses of sequential registers may be separated by greater than four bytes, such as 8 bytes, 1024 bytes, 4096 bytes, or the like. Although particular separations of registers have been given as examples, the separation may be any non-zero amount.

Although the stride parameter 108 is illustrated as separate from the registers 106, the stride parameter 108 may be part of the registers. For example, the stride parameter 108 may be stored within one of the registers 106.

Figure 2:
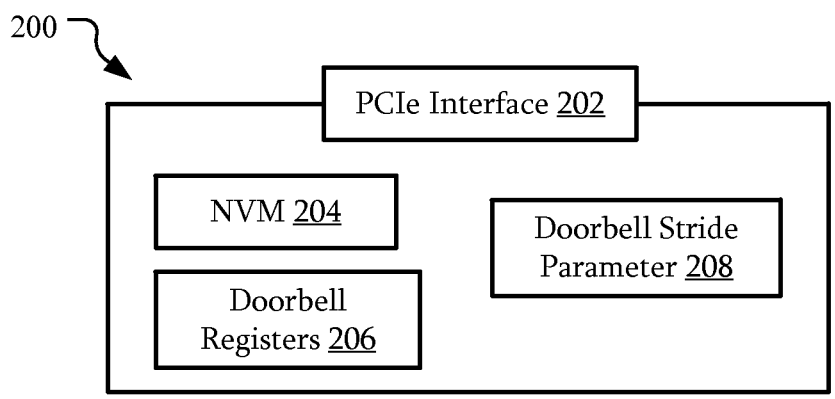
FIG. 2 is a schematic view of an NVMe device according to an embodiment.

FIG. 2 is a schematic view of an NVMe device according to an embodiment. The device 200 may be similar to the device 100 of FIG. 1; however, in this embodiment, the device is an NVMe device 200. In particular, the NVMe device 200 includes non-volatile memory (NVM) 204 and a PCI Express (PCIe) interface 202. In addition, the NVMe device 200 includes doorbell registers 206.

The doorbell registers 206 may be memory mappable registers associated with queues used to access the NVM memory 204. For example, the doorbell registers 206 may include doorbell registers associated with submission queues and/or completion queues used to access the NVM memory 204.

In an embodiment, the stride parameter may be a doorbell stride parameter 208. The doorbell stride parameter 208 is configured to indicate the stride of the doorbell registers 206. In particular, the doorbell stride parameter 208 is configured to indicate a non-zero separation of the doorbell registers.

Figure 3:
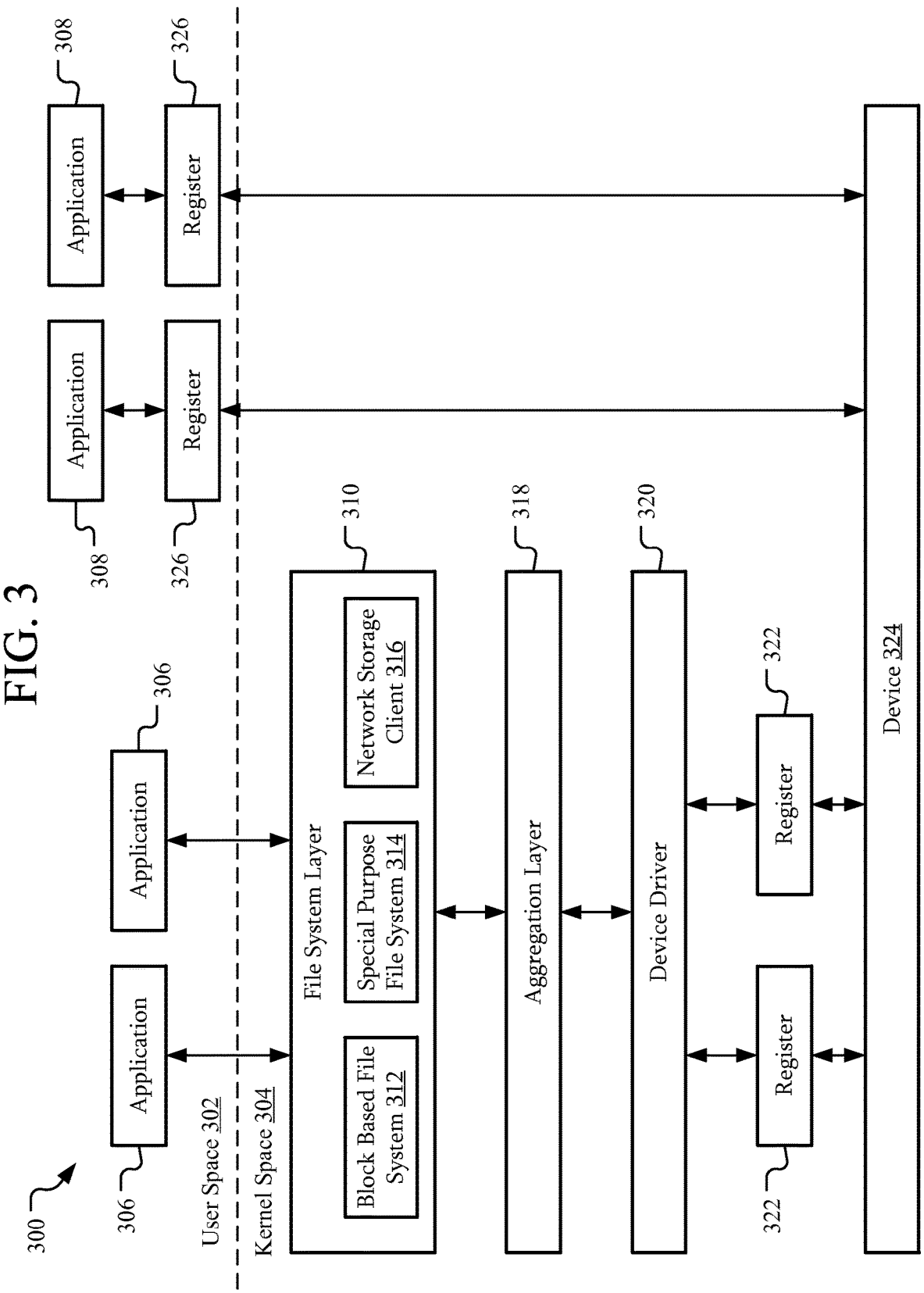
FIG. 3 is a schematic view of a system according to an embodiment.

FIG. 3 is a schematic view of a system according to an embodiment. In this embodiment, the system 300 includes a processor, illustrated by various operations that the processor is configured to perform. In particular, operations may be divided to operate in user space 302 or kernel space 304.

Here, multiple applications 306 running in user space 302 may access a device 324 through various layers in kernel space 304. For example, an application 306 may make a system call to a file system layer 310 that may include a block-based file system 312, a special purpose file system 314, a network storage client 316, or the like.

The file system layer 310 may call functions in an aggregation layer 318. The aggregation layer 318 may be configured to process block input/outputs, manage volumes, or the like. The aggregation layer 318 may access a device driver 320. The device driver 320 may in turn access memory mapped registers 322 associated with the device 324.

Although particular layers and/or organization of functions operating in kernel space 304 have been used as examples, other layers and/or organizations may be used. Regardless, accesses to the device 324 by the applications 306 pass through the various kernel layers. For example, an I/O request from an application 306 associated with the device 324 may first involve a context switch during the system call accessing the file system layer 310. The I/O request must then traverse the various kernel layers before the request may be submitted to the device 324.

The access may further include device-generated processor interrupts with an associated processor context switch to an arbitrary context for driver 320 service completion. In addition, memory-intensive I/O data movement may occur if a buffer copy is involved. Furthermore, another processor context switch back to the application 306 may occur to further process the requested data from device 324.

In this embodiment, the device 324 may be a device similar to the device 100 of FIG. 1. In particular, the device may have a stride parameter configured to indicate a stride between registers associated with the device 324. The processor may be configured to read the stride parameters and configure access to the device 324. In particular, the processor may be configured to map registers of the device 324 into virtual memory based on the stride parameter such that at least one register is mapped to user space virtual memory.

Here, registers 322 may be mapped into kernel space virtual memory; however, registers 326 may be mapped into user space 302.

As a result, I/O requests may achieve higher performance. In particular, accesses to the device 324 through the registers 326 may not include the context switches, traversal of various kernel layers, or the like incurred when accessing the device 324 through registers 322. Such software layers may have been designed to barricade the system 300 from the effects of legacy devices, such as high-latency, mechanical Hard Disk Drives (HDDs). Accordingly, in an embodiment, devices 324 that do not have the characteristics of legacy devices may be accessed without the overhead imposed by software designed for legacy devices.

In a particular example, reducing the effect of the additional kernel layers may need a higher performance and hence, higher cost processor. By substantially eliminating the impact of the various kernel layers, higher performance may be achieved without using a higher performance processor. Furthermore, as device 324 technology performance evolves, the kernel layer delays may dominate performance, resulting in substantial performance penalties. Such penalties may be reduced if not eliminated by accessing the device 324 through registers 326.

In an embodiment, the processor may include multiple processing cores. Each processing core may have multiple processing entities. For example, the processor may have 8 processing cores, each hyper-threaded for a total of 16 processing entities. The processor may be configured to map a number of registers into virtual memory greater than the processing entities. Using the example above, more than 16 registers may be mapped into virtual memory.

In a particular embodiment, when an operating system loads, the operating system, executing on the processor, may detect the number of available cores and/or processing entities. Device driver 320 logic may assist the operating system in discovering the capabilities of the device 324 or other similar devices. The processor may be configured to map registers 322 according to a number of processing entities. However, the processor may also be configured to map additional registers 326 beyond the number of processing entities.

Although a relationship greater than one register to each processing entity has been described above, in other embodiments, a number of sets of registers may greater than the number of processing entities. For example, access to a resource of the device 324 may involve two registers, such as a submission queue doorbell register and a completion queue doorbell register. A number of sets of registers, each set including a submission queue doorbell register and a completion queue doorbell register, may be mapped to virtual memory. That number of sets of registers may be greater than the number of processing entities.

Although a relationship to processing entities of a single processor have been used as an example, a number of registers and/or a number of sets of registers mapped to virtual memory may be greater than a total number of processing entities. For example, a server may have multiple multi-core processors. Each of the processors may be configured to map a number of registers and/or a number of sets greater than the number of processing entities into virtual memory.

In an embodiment, allocating a number of registers and/or a number of sets of registers greater than the number of processing entities may allow for use of more or all of the resources of the device 324. For example, a device 324 may be configured to have 128 registers that may be mapped to virtual memory as described above. However, a processor may be limited to 16 processing entities. Thus, allocating registers on a one-to-one basis with the processing entities would leave many registers unused. By mapping registers 326 to user space 302, more to all of the registers of the device 324 may be used.

In an embodiment, the bypassing of the various kernel layers in kernel space 304 may allow for different and/or improved functions in applications 308 than in applications 306. For example, by accessing the registers 326 without the intervening kernel layers may allow applications 308 such as database applications, flash aware type applications, key-value store type usage applications, RDMA applications, or the like to maintain their own pseudo file-system(s), and/or access the device 324 in customized and/or non-standard manners. Furthermore, such applications 308 may implement such techniques in user space 302, i.e., without a change to the various kernel layers. Moreover, the more direct access allows for even further customization and innovation by allowing access to devices that do not rely upon legacy kernel layers.

Figure 4:
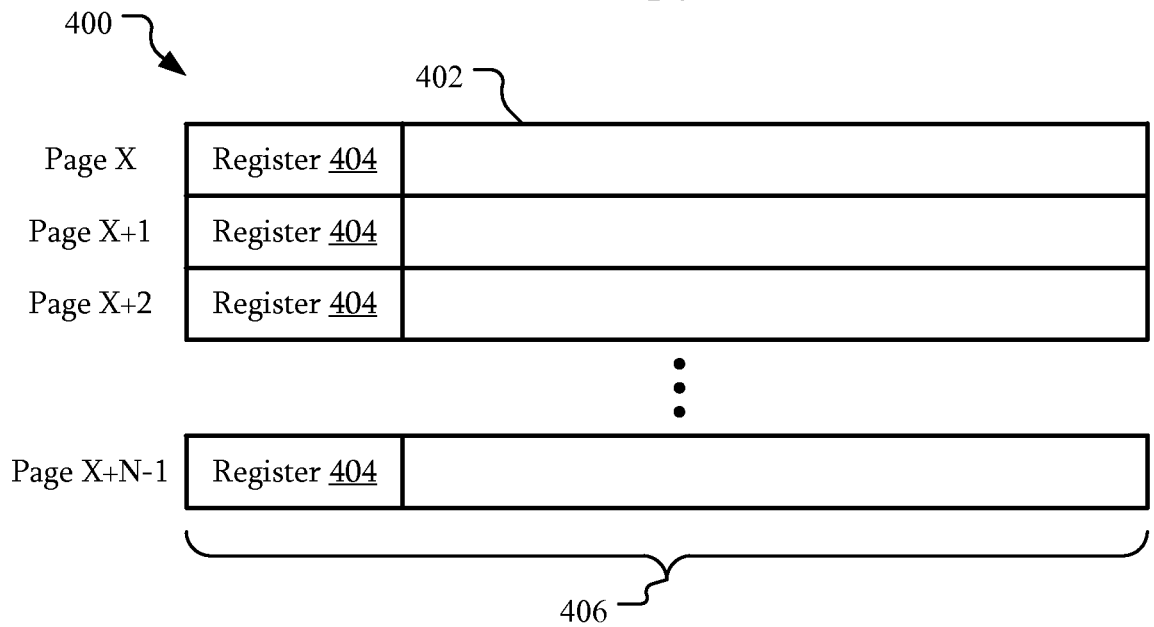
FIGS. 4 and 5 are block diagrams illustrating registers mapped to virtual memory pages according to various embodiments.
Figure 5:
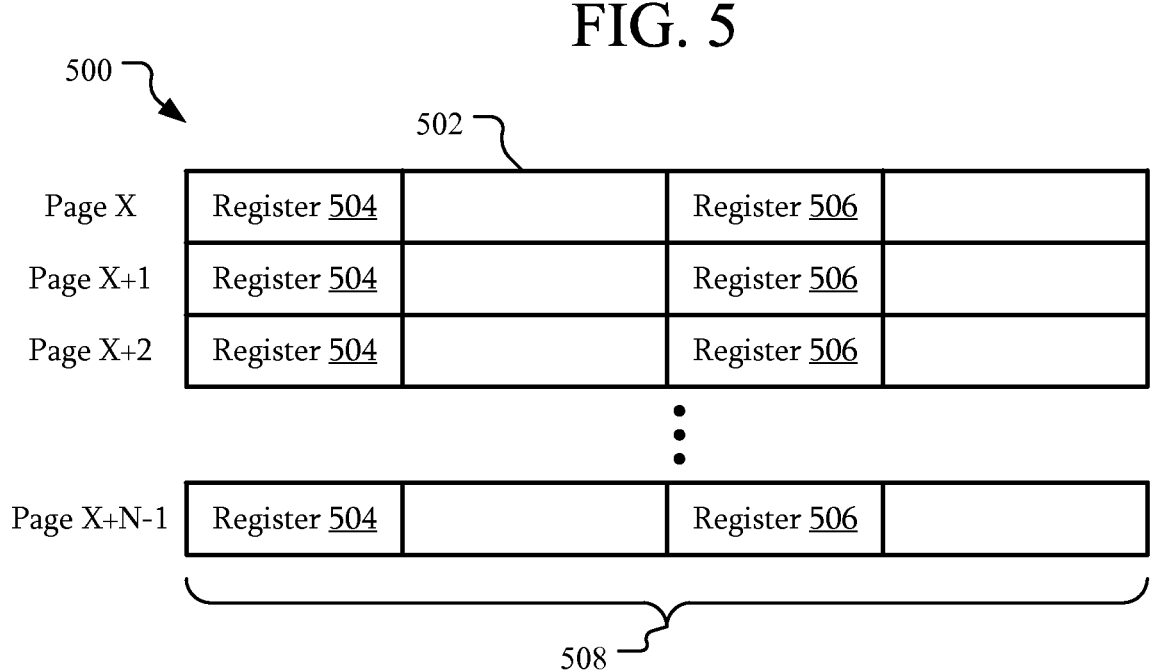

FIGS. 4 and 5 are block diagrams illustrating registers mapped to virtual memory pages according to various embodiments. Referring to FIG. 4, in this embodiment, registers 404 may be mapped to a portion of virtual memory 400. In particular, a stride parameter may be set such that a stride of the registers into virtual memory is greater than or equal to a virtual memory page size. Here, virtual memory pages 402 have a size 406. The stride parameter is set such that the stride is the size 406 of a page 402.

In this embodiment, N pages 402 are illustrated. The pages 402 into which the registers are mapped may begin at page X and continue to page X+N−1. As the stride parameter was set to set the stride between the registers 404 to the size 406 of a page 402, a register 404 is mapped to each page 402. Here, the register 404 is mapped to a beginning of an associated page 402; however, in other embodiments the register 404 may be mapped to a different location within a page 402.

Referring to FIG. 5, in this embodiment, registers 504 may be mapped into a portion of virtual memory 500. The stride parameter may be set such that a stride of the registers 504 is greater than a size of a single register 504, but less than a size 508 of a page 502. As a result, at least two registers 504 may be mapped to a single virtual memory page 502.

In an embodiment, the stride parameter may be set such that the stride of the registers 504 is half of the size 508 of a page 502. Thus, two registers 504 may be mapped to each of the N pages 502. Although two has been used as an example, any number of registers may be mapped to a page 502.

Figure 6:
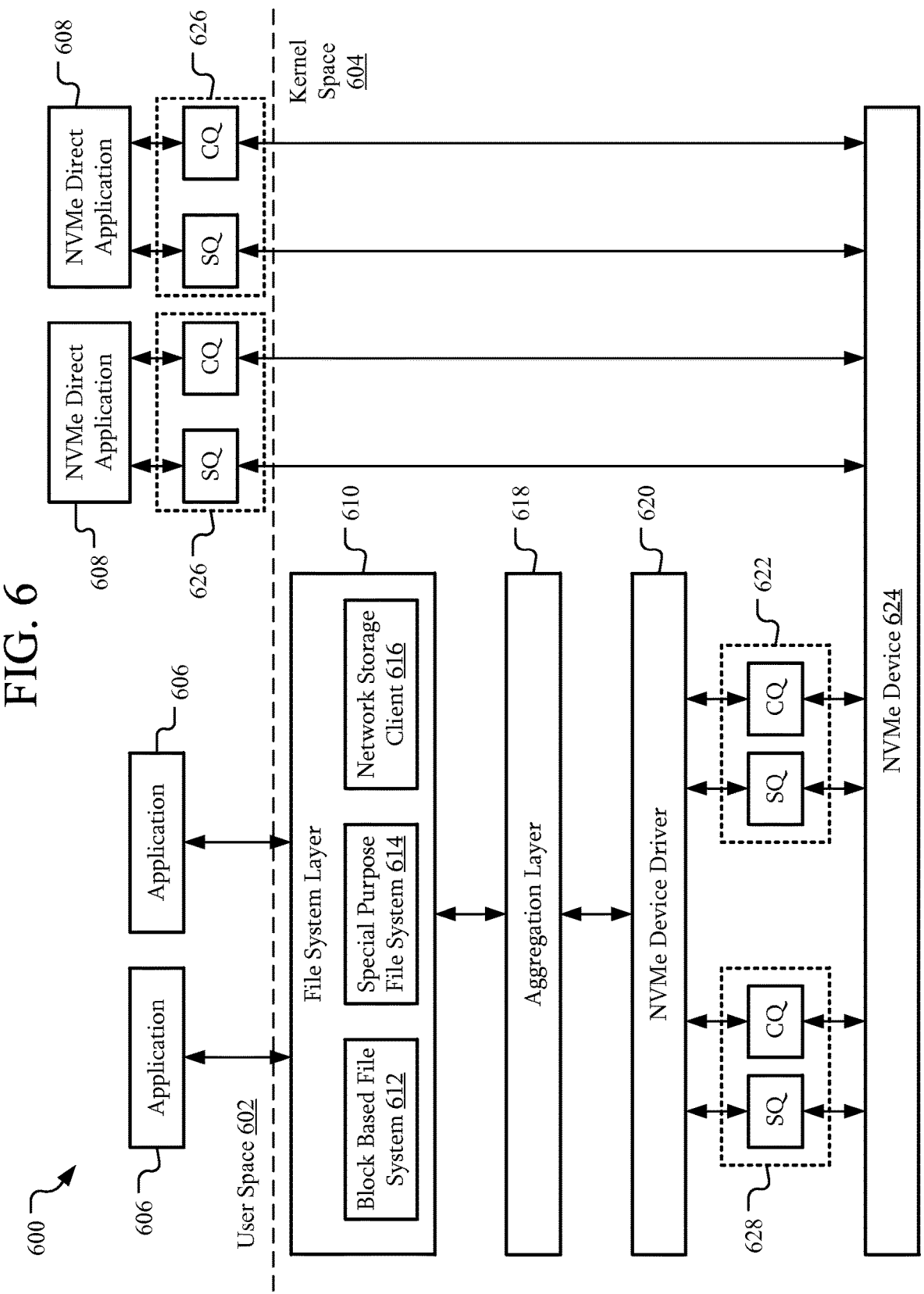
FIG. 6 is a schematic view of a system according to another embodiment.

FIG. 6 is a schematic view of a system according to another embodiment. In this embodiment, the system 600 may be similar to the system 300 of FIG. 3. For example, the system 600 may include user space 602, kernel space, 604, applications 606, file system layer 610 including a block based file system 612, a special purpose file system 614, and a network storage client 616, and an aggregation layer 618 similar to corresponding portions of the system 300 of FIG. 3.

However, in this embodiment, the system 600 includes an NVMe device 624 and a corresponding NVMe device driver 620. The NVMe device 624 is accessible through sets of doorbell registers 622, 626, and 628. Each of the sets of doorbell registers 622, 626, and 628 includes a submission queue doorbell register SQ and a completion queue doorbell register CQ. The submission queue doorbell register SQ and a completion queue doorbell register CQ may be associated with queues of the NVMe device 624.

Doorbell register sets 622 and 626 may include registers mapped to virtual memory in kernel space 604 and user space 602, respectively. Doorbell register set 628 may include a special purpose administrative queue. The doorbell register set 628 may also be mapped to virtual memory in kernel space 604.

In an embodiment, the NVMe device 624 may include an NVMe solid-state drive (SSD). NVMe device 624 may interact with the NVMe device driver 620 through PCIe hardware interfaces and use circular queues to service I/O requests. A submission queue associated with a submission queue doorbell register SQ may be used to present I/O requests to NVMe device 624 and a completion queue associated with a completion queue doorbell register CQ may be used to provide a response (if any). Although a submission queue doorbell register SQ and a completion queue doorbell register CQ are illustrated as being paired, in some embodiments, only one may be used, such as only the submission queue doorbell register SQ.

In an embodiment, during a boot process, the operating system may discover how many queues an NVMe device 624 is configured to provide. As described above, the NVMe device 624 may support many more queues than processing entities of the system 600. As example, the NVMe device 624 may support 129 queue pairs—one Administrator Submission and Administrator Completion queue pair, represented by the doorbell register set 628 and 128 non-administrative Submission and Completion queue pairs for I/O requests, represented by doorbell register sets 622 and 626.

In an embodiment, NVMe direct applications 608 may access doorbell register sets 626. As a result, the NVMe direct applications 608 may bypassing kernel layers, CPU context switches and interrupt latencies as described above. Access to the doorbell register sets 626 may also be used in virtualization and remote memory direct access (RDMA) applications.

In an embodiment, accessing more doorbell register sets 626 may allow an increase in performance in accessing an NVMe device 624 performance through increased parallelism. That is, the NVMe device 624 may be capable of servicing a number of queues greater than a number of processing entities of a processor. Thus, allowing access to a greater number of doorbell register sets 626 than the number of processing entities of a system 600 may result in increased performance.

In an embodiment, the doorbell register sets 626 may be decoupled from the NVMe device driver 620. That is, access to the device 624 may not pass through the NVMe device driver 620. As a result, higher-performance NVMe direct applications 608, such as flash-aware applications or others as described above may more directly access the NVMe device 624. Such access may reduce software latency for current and future NVM devices, including applications where software becomes a bottleneck.

Moreover, by mapping the doorbell register sets 626 to user space 602, NVMe direct applications 608 may allow innovations to be implemented in user space 602 rather than kernel space 604. Thus, changes to accesses to NVMe devices 624 may be made without restrictions or encumbrances associated with modifications to kernel space layers.

As described above, an NVMe device 624, such as an NVMe SSD, may comply with PCIe device standards. Thus, the NVMe device 624 may have standard PCIe hardware provisions as well as standardized NVMe interfaces. These may include standardized System Bus (PCI Express) Registers which contain the PCI Header Controller registers located in the MLBAR/MUBAR registers (PCI BAR0 and BAR1) that may be mapped to virtual memory in addition to doorbell registers that are mapped as described above.

Referring to FIGS. 4 and 6, in an embodiment, the submission queue doorbell registers SQ and completion queue doorbell registers CQ may be mapped as the registers 404. For example, submission queue doorbell registers SQ and completion queue doorbell registers CQ may be mapped in alternating pages 402. As a result, an NVMe direct application 608 may be permitted access to the two pages 402 containing the submission queue doorbell register SQ and completion queue doorbell register CQ.

In a particular embodiment, a controller capabilities field within a controller register layout may include a stride parameter. The stride parameter may be encoded in bits 35:32 of this field as a 4-bit Doorbell Stride (DSTRD) field.

Doorbell registers may be mapped beginning at offset 0x01000. That is, page X may begin at offset 0x01000. This offset may be defined, for example, by the offset in the MLBAR/MUBAR registers (PCI BAR0 and BAR1).

The first doorbell register may be a submission queue doorbell register SQ of a set associated with an administrator submission queue, mapped to register 404 of page X. The doorbell stride may be calculated using equation (1):

$$\text{Stride} = (2^{(2+DSTRD)}) \text{ in bytes} \quad (1)$$

DSTRD may be set such that the stride is equal to the page size 406. As a result, the next queue, which may be a completion queue doorbell register CQ associated with an administrator completion queue, may be mapped to register 404 of page X+1.

The submission queue doorbell register SQ and completion queue doorbell register CQ of set 622 may be mapped into pages X+2 and X+3, respectively. Similarly, submission queue doorbell register SQ and completion queue doorbell register CQ of sets 626 may be mapped into pages X+4 through X+7. As a result, the doorbell registers are each mapped into different pages 402. If a doorbell register is associated with various kernel layers in kernel space 604, the associated pages may be separated from doorbell registers mapped to user space 602. As a result, even though a user space 602 application has access to pages X+4 through X+7 or the like, access to registers 404 mapped to other pages 402 and, in particular, pages 402 mapped to kernel space virtual memory, may be protected from user space 602 access while still being available to kernel software layers.

Referring back to the example of equation (1), with a DSTRD of zero, the stride is 4 bytes, i.e., the size of a 4 byte doorbell register. As a result, no intervening space between the end of one doorbell and the beginning of the next doorbell. Hence, a zero DSTRD value would cause the doorbell registers to be mapped without intervening space.

While having a DSTRD having a zero value may be space-wise efficient and allow for all doorbell registers to reside within a single memory page 402, if all doorbell registers are mapped to one page 402 the doorbell registers may be exposed to both user space 602 applications and kernel space 604 operations. Thus, user space 602 applications may have access to doorbell register they should not have access to, including those supposedly controlled only by the operating system. In contrast, by mapping the doorbell registers to different pages 402 allows the operating system to limit user space 602 applications from improperly accessing other doorbell registers.

In particular, this mapping may be achieved by setting the DSTRD value to a non-zero value. For example, setting DSTRD to a value of 10 separates the doorbell registers by 4096 bytes. If the page size 406 is 4096 bytes, then each doorbell register will reside in its own page. Pages 402 with doorbell registers intended for user space 602 applications may be mapped into user space 602 accessible memory without compromising other NVMe device 624 activities.

Referring to FIGS. 5 and 6, in another embodiment, both a submission queue doorbell register SQ and a completion queue doorbell register CQ may be mapped to a single page 502. That is register 504 may be a submission queue doorbell register SQ and register 506 may be a completion queue doorbell register CQ.

For example, setting DSTRD to a value of 9 results in a stride of 2048 bytes. Thus, if a submission queue doorbell register SQ is on a page 502 boundary, an associated completion queue doorbell register CQ may be located 2048 bytes after in the same page 502. Although page sizes of 4096 have been used as example, other page sizes may be used with the stride parameter set to a value to achieve the desired mapping of registers. For example, a page size may be 16 Kbytes. The stride parameter may be set such that the stride is 16 Kbytes in the case of one doorbell register per page, 8 Kbytes for two doorbell registers per page, or the like.

Figure 7:
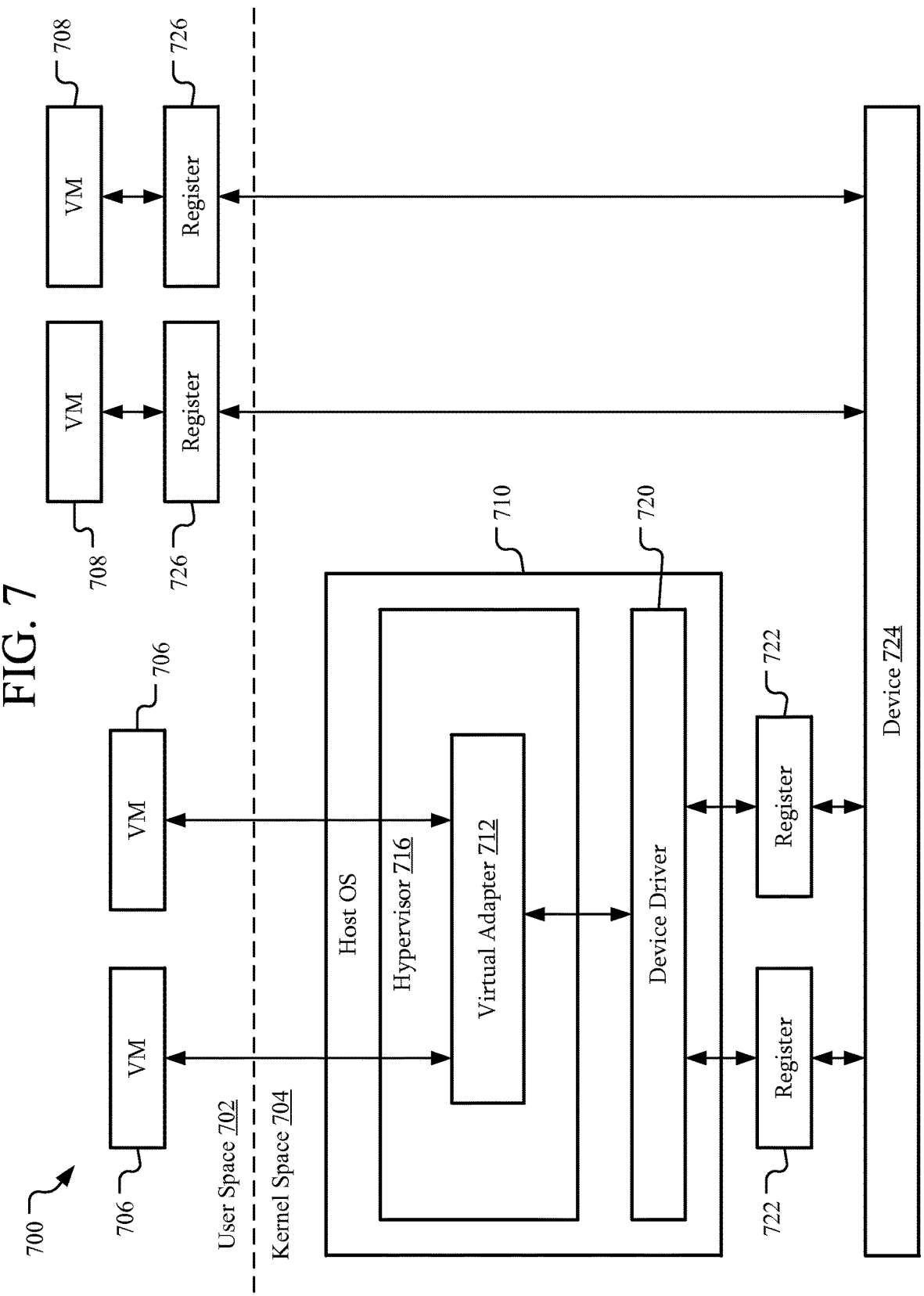
FIG. 7 is a schematic view of a system according to another embodiment.

FIG. 7 is a schematic view of a system according to another embodiment. In this embodiment, the system 700 may be similar to the system 300 of FIG. 3. For example, the system 700 may include user space 702, kernel space, 704, registers 722 and 726, and device 724 similar to corresponding portions of the system 300 of FIG. 3.

However, in this embodiment of the system 700, the processor may be configured to present one or more virtual machines (VM) 706 and 708. With respect to VMs 706, a host operating system (OS) 710 may operate in kernel space 704. The host OS 710 may include the device driver 720 and a hypervisor 716. The hypervisor 716 may be configured to manage the VMs 706. In particular, the hypervisor 716 may be configured to present a virtual adapter 712 associated with the device 724. For example, the virtual adapter 716 may present virtualized instances of the device 724. However, in some embodiments, the virtual adapter 712 may be configured to give direct access to one or more registers 722. That is, one or more registers 722 may be mapped into virtual memory associated with a VM 706. Here, the virtual memory may be kernel space virtual memory; however, in other embodiments, the virtual memory may be user space virtual memory.

With respect to VMs 708, registers 726 may be mapped to user space 702 such that VMs 708 may access the registers 726 without the associated kernel layers of the host OS 710. Accordingly, a VM 708 may not need Single Root I/O Virtualization and Sharing (SR-IOV) compliant circuitry, reducing costs.

In an embodiment, the access to the device 724 by a VM 708 may include access to a reduced feature set. That is, the VM 708 may not have access to a virtual instance of the entire device 724. Here, the VM 708 has access to an actual register 726 of the device 724 rather than a virtual instance of the entire device 724. However, in other embodiments, a VM 708 may have access to more than one register 726, more than one set of registers similar to set 626 of FIG. 6, or the like.

Figure 8:
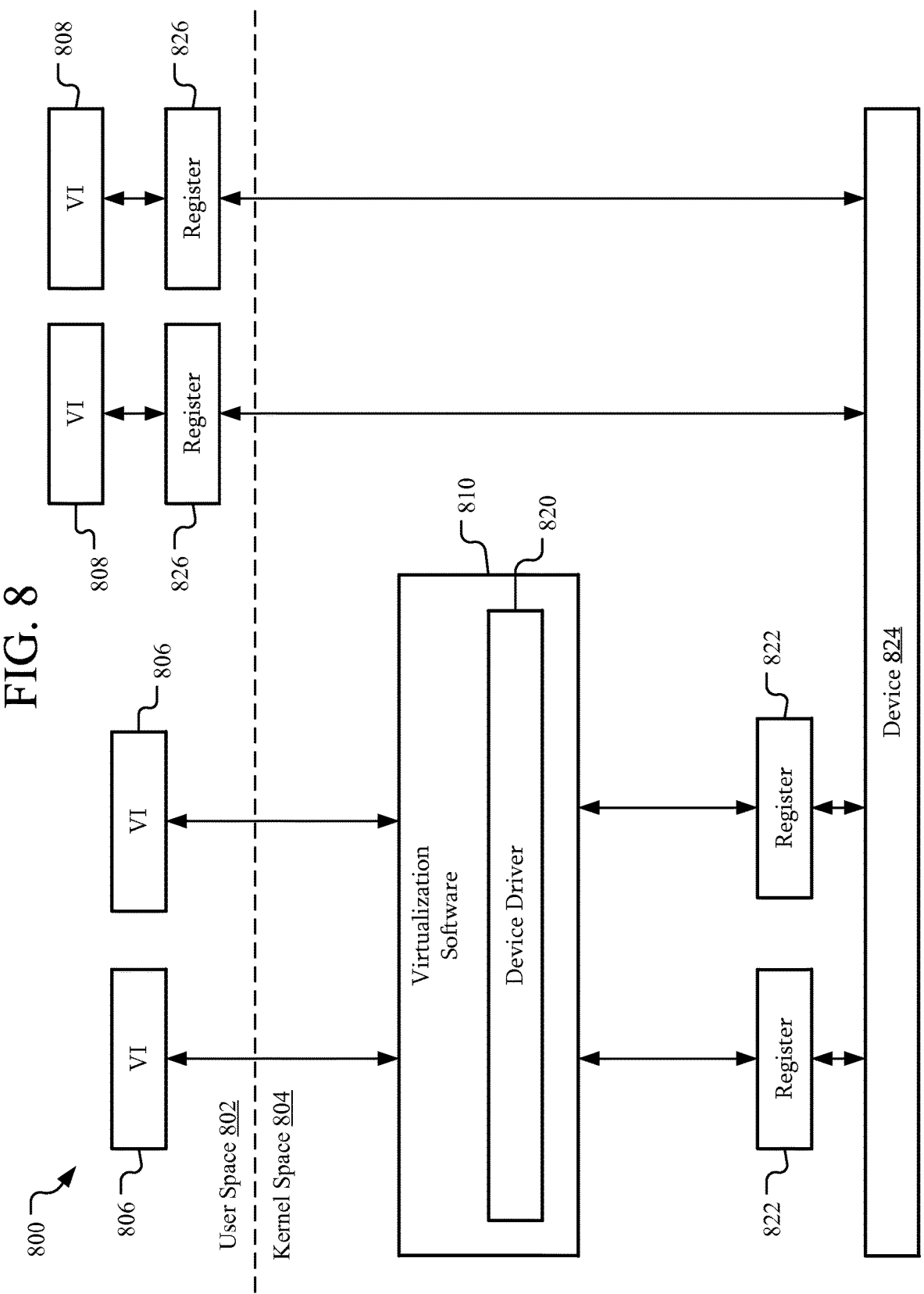
FIG. 8 is a schematic view of a system according to another embodiment.

FIG. 8 is a schematic view of a system according to another embodiment. In this embodiment the system 800 may be similar to the system 700 of FIG. 7. For example, the system 800 may include user space 802, kernel space, 804, device driver 820, registers 822 and 826, and device 824 similar to corresponding portions of the system 700 of FIG. 7.

Although VMs have been used as examples of virtualization that may have improved performance due to mapping of the registers described herein, in other embodiments, other types of virtualization, including those at different levels may be used. For example, software containers, application-level virtualization, or the like, represented here as virtual instances (VI) 806 and 808 may use the mapping of registers described herein. Virtualization software 810 represents the software that enables the VIs 806 and 808. Using software containers as a particular example of the VIs 806 and 808, as software containers may use fewer resources than VMs when scaling, the increased parallelism and other increased performance of various embodiments described herein may allow access to a device 824 to scale with the software containers.

Figure 9:
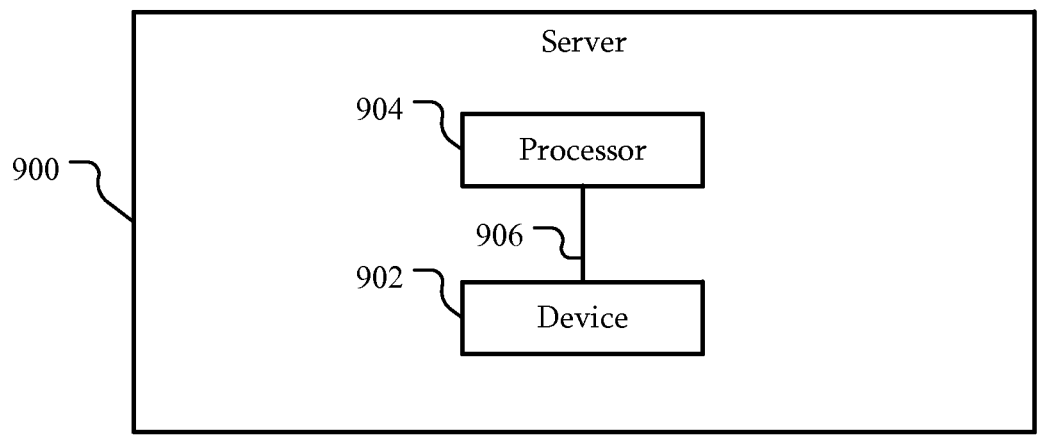
FIG. 9 is a schematic view of a server according to an embodiment.

FIG. 9 is a schematic view of a server according to an embodiment. In this embodiment, the server 900 may include a stand-alone server, a rack-mounted server, a blade server, or the like. The server 900 includes a processor 904, and a device 902. The processor 904 is coupled to the device 902 through the communication path 906, such as a PCIe bus or other bus as described above. The device 902 and processor 904 may be any of the above described corresponding components and systems. For example, the device 902 may be an NVMe SSD having a stride parameter indicating a non-zero stride between doorbell registers and the processor 904 may be configured to map at least one of those registers to user space.

Figure 10:
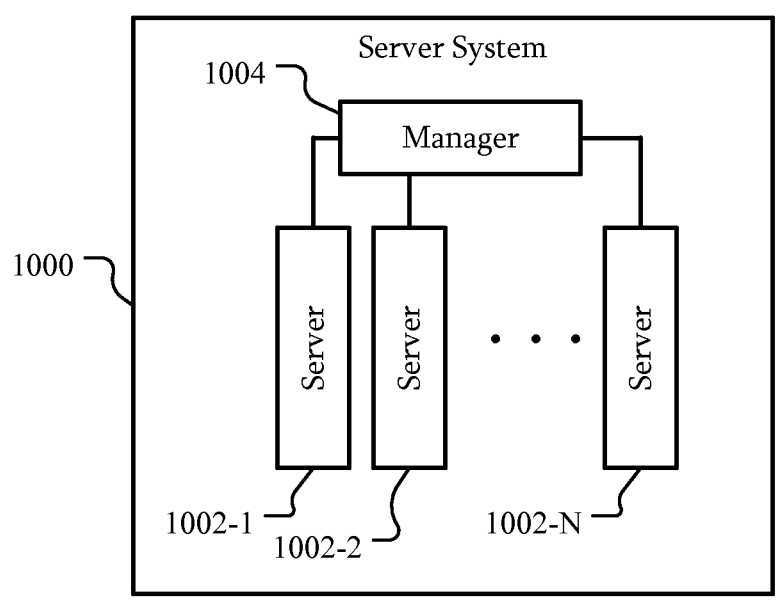
FIG. 10 is a schematic view of a server system according to an embodiment.

FIG. 10 is a schematic view of a server system according to an embodiment. In this embodiment, the server system 1000 includes multiple servers 1002-1 to 1002-N. The servers 1002 are each coupled to a manager 1004. One or more of the servers 1002 may be similar to the server 900 described above. In addition, the manager 1004 may include a system with a device as described above.

Figure 11:
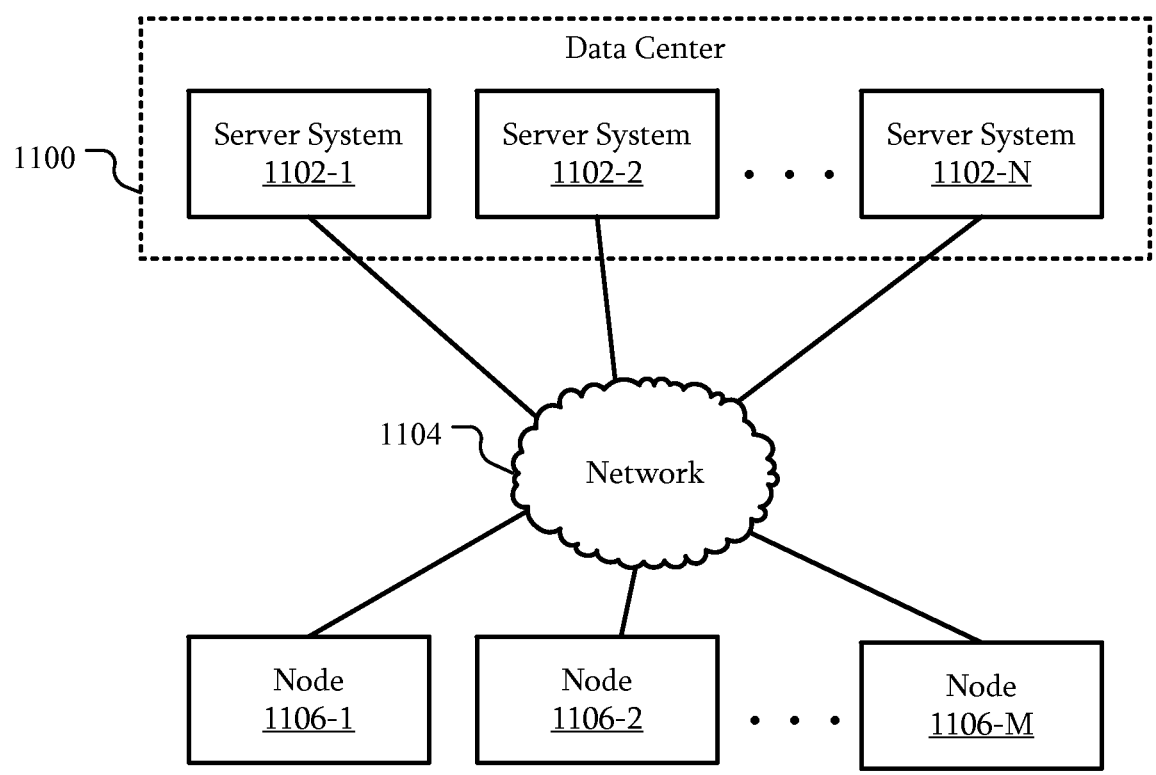
FIG. 11 is a schematic view of a data center according to an embodiment.

FIG. 11 is a schematic view of a data center according to an embodiment. In this embodiment, the data center 1100 includes multiple servers systems 1102-1 to 1102-N. The server systems 1102 may be similar to the server system 1000 described above in FIG. 10. The server systems 1102 are coupled to a network 1104, such as the Internet. Accordingly, the server systems 1102 may communicate through the network 1104 with various nodes 1106-1 to 1106-M. For example, the nodes 1106 may be client computers, other servers, remote data centers, storage systems, or the like. In some embodiments, one or more of the server systems 1102 and nodes 1106 may include devices and/or systems as described herein.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A system, comprising:
   a non-volatile memory express (NVMe) device comprising a memory and a plurality of registers, a stride parameter being stored in the memory that indicates a stride between each of the plurality of registers, the plurality of registers comprising at least one pair of first registers that are mappable into a kernel space and at least one pair of second registers that are mappable into a user space, each pair of first registers comprising a submission queue doorbell register and a completion queue doorbell register, and each pair of second registers comprising a submission queue doorbell register and a completion queue doorbell register that are adjacent to each other in the user space; and a processor coupled to a processor-local bus, the processor:

reading the stride parameter stored in the memory of the NVMe device through the processor-local bus; and mapping the first registers into the kernel space and the second registers into the user space based on the stride parameter, the at least one pair of first registers being separated in kernel space by the stride parameter and the at least one pair of second registers being separated in user space by the stride parameter.

2. The system of claim 1, wherein registers of a first pair of first registers are adjacent to each other in the kernel space.

3. The system of claim 2, wherein the plurality of registers comprises a first predetermined number of first registers, and the processor comprises a second predetermined number of processing entities, and
wherein the first predetermined number is greater than the second predetermined number.

4. The system of claim 2, wherein the processor-local bus comprises a Peripheral Component Interconnect Express (PCIe) bus.

5. The system of claim 2, wherein a value of the stride parameter is greater than or equal to a page size in the user space.

6. The system of claim 2, wherein a value of the stride parameter is greater than a size of the registers of the plurality of registers.

7. The system of claim 2, wherein a value of the stride parameter is less than a page size in the user space.

8. The system of claim 2, wherein a value of the stride parameter places a pair of second registers into a single page of the user space.

9. The system of claim 2, wherein:
the processor further presents a virtual machine; and
at least one pair of second registers is mapped into a virtual memory associated with the virtual machine.

10. The system of claim 2, wherein the processor further maps the second registers to be accessible by a user space application without intervening kernel layers.

11. A method, comprising:
reading, by a processor, a stride parameter stored in a memory of a non-volatile memory express (NVMe) device coupled to a processor-local bus, the NVMe device comprising the memory and a plurality of registers, a stride parameter indicating a stride between each of the plurality of registers, the plurality of registers comprising at least one pair of first registers that are mappable into a kernel space and at least one pair of second registers that are mappable into a user space, each pair of first registers comprising a submission queue doorbell register and a completion queue doorbell register, and each pair of second registers comprising a submission queue doorbell register and a completion queue doorbell register that are adjacent to each other in the user space; and mapping, by the processor, the first registers into the kernel space and the second registers into the user space based on the stride parameter, the at least one pair of first registers being separated in kernel space by the stride parameter and the at least one pair of second registers being separated in user space by the stride parameter.

12. The method of claim 11, wherein registers of a first pair of first registers are adjacent to each other in the kernel space.

13. The method of claim 12, wherein a value of the stride parameter is greater than or equal to a page size in the user space.

14. The method of claim 12, wherein a value of the stride parameter is less than a page size in the user space.

15. The method of claim 12, further comprising:
presenting a virtual machine; and
wherein mapping the at least one pair of second registers comprises mapping the at least one pair of second registers into a virtual memory associated with the virtual machine.

16. A non-volatile memory express (NVMe) device, comprising:
a memory that stores data;
a plurality of registers comprising at least one pair of first registers that are mappable into a kernel space and at least one pair of second registers that are mappable into a user space, each pair of first registers comprising a submission queue doorbell register and a completion queue doorbell register, each pair of second registers comprising a submission queue doorbell register and a completion queue doorbell register, and registers of a first pair of second registers being adjacent to each other in the user space; and
a stride register that stores a stride parameter that indicates a separation between the at least one pair of first registers in kernel space and a separation between the at least one pair of registers in user space.

17. The NVMe device of claim 16, wherein registers of a pair of first registers are adjacent to each other in the kernel space.

18. The NVMe device of claim 17, wherein a value of the stride parameter is greater than or equal to a page size in the user space.

19. The NVMe device of claim 17, wherein a value of the stride parameter is less than a page size in the user space.

* * * * *